July 31, 1951   E. A. BENDER   2,562,483
WEDGE LOCK BEAM CONNECTOR
Filed March 25, 1949   2 Sheets-Sheet 1

INVENTOR.
EMIL A. BENDER
BY HIS ATTORNEYS.
HARRIS, KIECH, FOSTER & HARRIS
BY

July 31, 1951 E. A. BENDER 2,562,483
WEDGE LOCK BEAM CONNECTOR
Filed March 25, 1949 2 Sheets-Sheet 2

INVENTOR.
EMIL A. BENDER
BY HIS ATTORNEYS.
HARRIS, KIECH, FOSTER & HARRIS

Patented July 31, 1951

2,562,483

UNITED STATES PATENT OFFICE 2,562,483

WEDGE LOCK BEAM CONNECTOR

Emil A. Bender, Bakersfield, Calif.

Application March 25, 1949, Serial No. 83,324

2 Claims. (Cl. 189—36)

My invention relates to a fastening device and, more particularly, to a means for fastening steel structural members together and it has many uses. For example, in the oil industry it is now the practice to drill oil wells with portable derricks which are heavy steel structures sometimes one hundred and ten feet high which, when dismantled into smaller parts or assemblies, may be carried to the well site on trucks, quickly erected, and quickly dismantled, and carried away when the well is completed. The heavy structure so used must support heavy machinery and withstand heavy strains and is placed on a massive structural steel base which is forty feet long and made up of many heavy steel members. The problem has presented itself of quickly securing together and quickly dismantling these bases, and I have solved this problem by the means hereinafter described but, of course, this means is adapted to other purposes.

Prior to the use of my invention these bases had their members secured together by a multiplicity of bolts, and the erection of the bases and placing and setting up of these bolts was a time-consuming operation, especially when performed in the field by common labor under the conditions then existing. My invention involves the use of one heavy wedge to replace several bolts. Such a wedge may be put in place and driven home by the use of a hammer and disengaged by a hammer. Bolts are quite unsatisfactory when used in fastenings, which must be repeatedly used, since the threads of bolts may be "galled" or marred by repeated use, are likely to be mislaid or lost, and their use involves the expenditure of a lot of time. Moreover, careful inspection is necessary to insure that they are set up properly. I recognize that wedges have previously been used as fastening means, but I think patentable novelty resides in the way I apply these wedges and the combinations of elements necessary to enable them to be so used; these combinations being definitively set forth in the claims.

The drawings illustrate one embodiment of my invention, and in these drawings:

Fig. 3 shows the stirrup in extended position and engaged by the wedge and Fig. 4 shows the stirrup in retracted position so that it can be easily shipped and handled.

Figure 1:
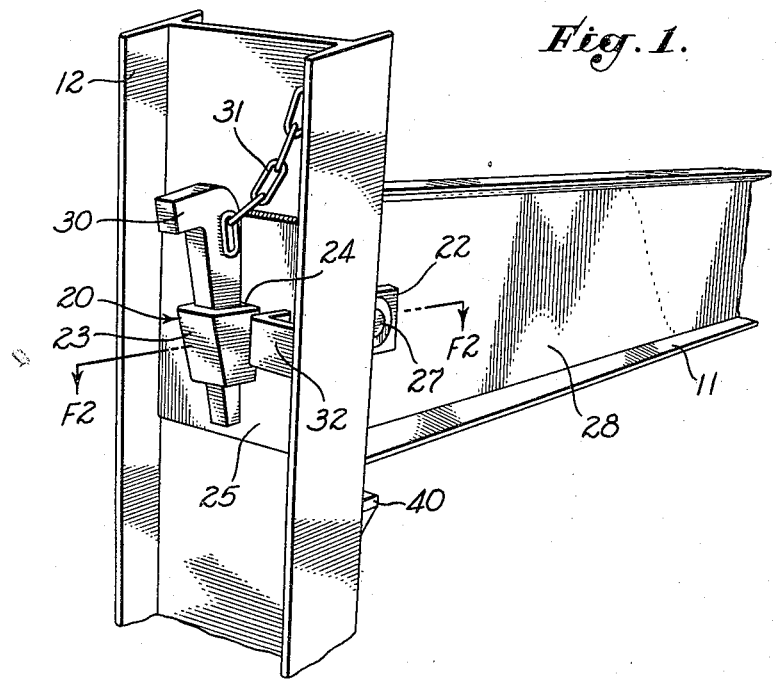
Fig. 1 is a perspective view of the method of connecting an I beam to an I column.

These drawings show a method of connecting a first structural member or beam 11 to a second member or column 12. These structural members illustrated are I beams, but the invention can be used with equal utility in connecting other structural members such as angle irons and channels to each other or together. A base plate member 13 is secured to the member 11 by welding, as shown at 14, the end of the member 11 being squared off if necessary to hold the base plate member 13 in a plane to which the axis of the member 11 is perpendicular. The base plate 13 has a rectangular hole 15 cut therein. A stirrup 20 is formed from a bar of steel having a rectangular cross section, this bar being bent to form legs 21 and 22 joined at their outer ends by a bearing portion 23. The stirrup 20 may also be formed by joining the outer ends of two steel bars with a wedge block which is welded or otherwise affixed thereto. The second member 12 has a rectangular hole 24 therein, the holes 24 and 15 registering with each other when the members 11 and 12 are finally connected as shown in Fig. 1, the holes being only slightly larger than the stirrup 20 which fits in and passes readily therethrough.

Figure 2:
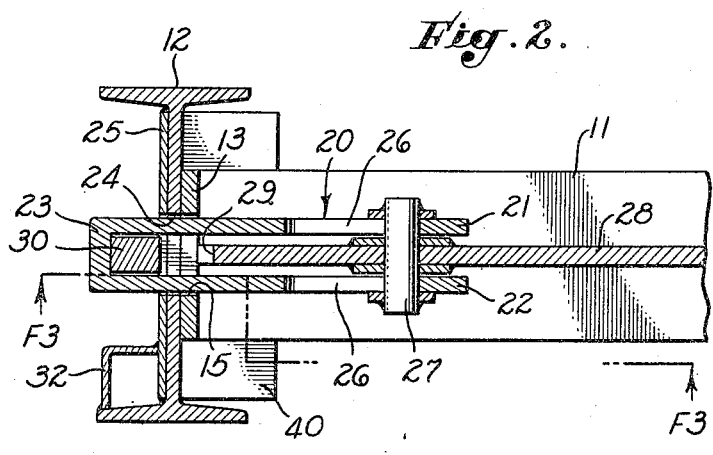
Fig. 2 is a section on a plane represented by the line F2—F2 of Fig. 1 viewed in the direction of the arrows.
Figure 3:
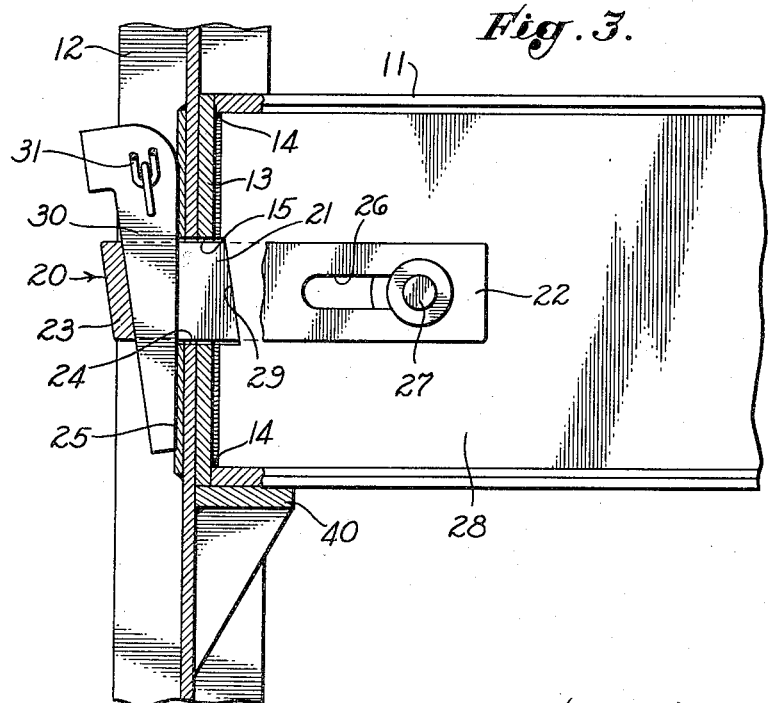
Fig. 3 is a section on a bent plane indicated by the line F3—F3 of Fig. 2 and viewed in the direction of the arrows at the end of said line.
Figure 4:
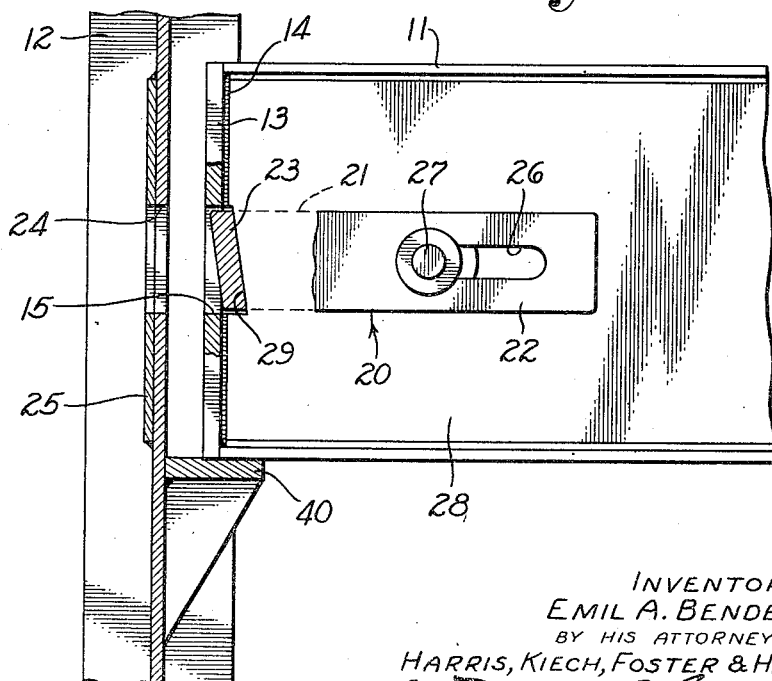
Fig. 4 is a view similar to Fig. 3.

In practice, I sometimes find it desirable to reinforce the web of the member 12 with a bearing plate 25, this bearing plate having a hole therein which registers with the hole 24 and is of approximately the same size. The legs 21 and 22 of the stirrup have slots 26 therein, these slots being engaged by a pin 27 which passes through and is rigidly secured in the web 28 of the first member 11. These slots are of such length that when the stirrup 20 is pulled to its extreme right-hand position, as seen in Fig. 4, the bearing portion 23 of the stirrup is carried in a recess 29 in the web 28, and, when the stirrup is moved to its extreme left-hand position as shown in Fig. 3, the stirrup projects through the holes 15 and 24 as shown in Figs. 1, 2, and 3. With the stirrup in this extended position, a wedge 30 can be inserted in the stirrup, this wedge being slightly narrower than the distance between the legs 21 and 22 and being so formed that when it is driven down into place, as shown in Figs. 1, 2, and 3, it pulls the base plate 13 of the first member 11 solidly up against the web of the second member. To prevent it from being lost, I may attach one end of a chain 31 to the wedge, the other end of the chain being attached to the member 12, and I may provide a socket 32 in which the wedge may be placed when not in use. The inner surface of the bearing portion 23 of the stirrup 20 is preferably so shaped that it provides a bearing along its entire length for the wedge 30 when the wedge is driven home, as shown in Figs. 1 and 3.

In practice, the parts are prefabricated in the shop so that they will readily go together, and the stirrup 20 is moved into its retracted position as shown in Fig. 4 so that it will not be injured by rough handling before the parts are put in place. To provide additional strength and facilitate putting the parts together, I may provide a bracket 40 which is welded or otherwise secured to the web of the second member 12 in such a position that the first member may be rested thereon with the holes 15 and 24 in substantial alignment.

It will be noted that the flanges of the second member do not play any part in the fastening, only the web of the I beam being utilized and the first member 11 could be attached to any plate or to the web or leg of any structural member. The flanges of the first member 11 play a part in the fastening as they support the base plate 13 in correct alignment to insure that the axis of the first member 11 is perpendicular to the axis of the plate, and also to the axis of the web of the second member.

The fact that the stirrup 20 may be retracted into the position shown in Fig. 4 for shipment is quite important as the beams are used repeatedly, being thrown in and out of trucks, and a permanently projecting stirrup would be quickly knocked off or bent. I have found that my fastening has great utility when used to temporarily connect derrick parts and is a substantial improvement over bolted joints.

I claim as my invention:

1. In a structural joint: a first member having a web and a flange, a bearing plate secured to said member across one end thereof substantially normal to said flange and web, an opening through said bearing plate and extending transversely across the end of said web, a second member having a supporting web abutting the face of said bearing plate, an opening through said supporting web in alignment with said opening through said bearing plate, a generally U-shaped stirrup arranged with its legs extending through said aligned openings and along opposite sides of said web, means connecting said legs to said web for limited sliding movement thereon away from said supporting web whereby to permit retracting said stirrup through said aligned openings, and a wedge projecting between the legs of said stirrup and having opposed relatively inclined surfaces bearing against the bight of said stirrup and said supporting web, respectively, the end of said web adjacent the opening in said bearing plate being provided with a recess adapted to accommodate the said bight portion of said stirrup when said stirrup is retracted through said openings.

2. A joint as defined in claim 1 wherein said means connecting said legs to said web comprises a longitudinally extending closed-ended slot in each of said legs and pin means projecting outwardly of each face of said web and through said slots, and a bracket fixed relative to said supporting web and underlying and engaging said first member whereby to support said first member in position to insure alignment of said openings.

EMIL A. BENDER.

REFERENCES CITED

The following references are of record in the file of this patent:

UNITED STATES PATENTS

| Number | Name | Date |
|---|---|---|
| 953,268 | Hines | Mar. 29, 1910 |
| 1,192,207 | Kahn | July 25, 1916 |
| 2,098,734 | Wait | Nov. 9, 1937 |
| 2,134,008 | Sharp | Oct. 25, 1938 |
| 2,461,648 | Macleod | Feb. 15, 1949 |